United States Patent
Gotanda et al.

(10) Patent No.: US 6,705,653 B2
(45) Date of Patent: Mar. 16, 2004

(54) SHOCK ABSORBING MEMBER AND BUMPER

(76) Inventors: Terutsugu Gotanda, 1-11-6, Suehiro-cho, Kariya-shi, Aichi-ken (JP); Shinichi Haneda, 1-9-17, Imaike-cho, Anjo-shi, Aichi-ken (JP); Kazuo Mori, 33-5, Nishida, Noda-cho, Kariya-shi, Aichi-ken (JP); Daichi Kunishi, c/o Toyota Jidosha Kabushiki Kaisha, 1, Toyota-cho, Toyota-shi, Aichi-ken 471-8571 (JP); Kazunobu Nuno, 21, Nakaneyama, Takaokahonmachi, Toyota-shi, Aichi-ken (JP); Kazunari Azuchi, 34-39, Saiwai-cho, Himi-shi, Toyama-ken (JP)

(*) Notice: Subject to any disclaimer, the term of this patent is extended or adjusted under 35 U.S.C. 154(b) by 0 days.

(21) Appl. No.: 09/989,446

(22) Filed: Nov. 21, 2001

(65) Prior Publication Data

US 2002/0063433 A1 May 30, 2002

(30) Foreign Application Priority Data

Nov. 21, 2000 (JP) .................. 2000-354822

(51) Int. Cl.⁷ .................. B60R 19/20
(52) U.S. Cl. .................. 293/132; 293/133
(58) Field of Search .................. 293/132, 133, 293/102; 296/187.01, 187.03, 187.08, 187.09

(56) References Cited

U.S. PATENT DOCUMENTS

| | | | | |
|---|---|---|---|---|
| 3,146,014 A | * | 8/1964 | Kroell | 293/133 |
| 4,778,208 A | * | 10/1988 | Lehr et al. | 293/133 |
| 5,100,189 A | * | 3/1992 | Futamata et al. | 293/132 |
| 5,224,574 A | * | 7/1993 | Thum | 296/188 |
| 5,314,229 A | * | 5/1994 | Matuzawa et al. | 296/189 |
| 5,419,416 A | * | 5/1995 | Miyashita et al. | 188/371 |
| 5,857,702 A | * | 1/1999 | Suga et al. | 296/189 |
| 5,868,457 A | * | 2/1999 | Kitagawa | 296/188 |
| 6,080,463 A | * | 6/2000 | Togawa et al. | 296/189 |
| 6,221,930 B1 | * | 4/2001 | Tada et al. | 293/102 |
| 6,231,095 B1 | * | 5/2001 | Chou et al. | 293/133 |
| 6,270,131 B1 | | 8/2001 | Martinez et al. | |
| 6,293,587 B1 | * | 9/2001 | Lapic et al. | 293/133 |
| 6,382,709 B1 | * | 5/2002 | Chirifu et al. | 296/189 |
| 6,409,239 B1 | * | 6/2002 | Tjoelker et al. | 293/133 |
| 2002/0079711 A1 | * | 6/2002 | Kajiwara et al. | 293/133 |

FOREIGN PATENT DOCUMENTS

| | | |
|---|---|---|
| DE | 196 15 875 A1 | 10/1987 |
| DE | 692 17 188 T2 | 6/1997 |
| DE | 197 11 647 A1 | 10/1998 |
| EP | 0 546 352 B1 | 1/1997 |
| EP | 1 035 351 A1 | 9/2000 |
| JP | 6-247338 A | 9/1994 |
| JP | 7-35252 U | 6/1995 |
| JP | 8-268323 A | 10/1996 |
| JP | 8-310440 A | 11/1996 |
| JP | 11-29064 A | 2/1999 |
| JP | 11-208519 A | 8/1999 |

* cited by examiner

Primary Examiner—D. Glenn Dayoan
Assistant Examiner—Hilary Gutman (57) ABSTRACT

A shock absorbing member for a vehicle is designed to absorb the impact energy in a plastic deformation manner to absorb the axial compressive load. The shock absorbing member includes a hollow member whose cross-section is roughly constant and whose axis is adapted to extend forward and rearward of the vehicle. A flange is formed on the hollow member roughly along the axis of the hollow member and projects by an amount increasing gradually from one side toward the other side of the axis.

18 Claims, 5 Drawing Sheets

SHOCK ABSORBING MEMBER AND BUMPER

FIELD OF THE INVENTION

This invention generally relates to a shock absorbing structure for absorbing shock in a vehicle. More particularly, the present invention pertains to a shock absorbing member and a bumper for a vehicle which absorbs impact energy through plastic deformation to absorb the axial compressive load.

BACKGROUND OF THE INVENTION

Figure 7:
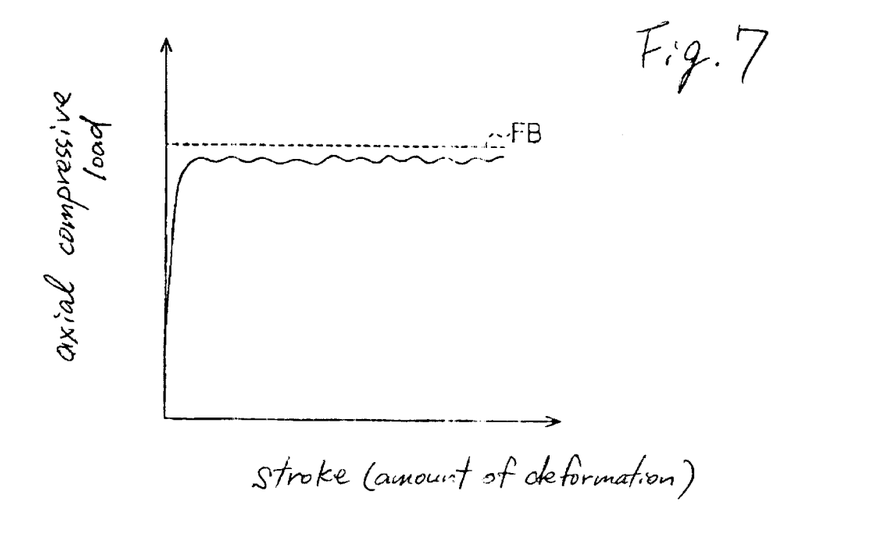
FIG. 7 is a graph showing the relationship between the axial compressive load and the stroke of a known shock absorbing member.

In general, vehicles are provided with a shock absorbing member for absorbing the impact energy arising upon a collision or other type of impact. A collision causes an axial compressive load and this load is applied to the shock absorbing member. The shock absorbing member absorbs the impact by repeating a bellows-like buckling deformation continuously. Ideally the shock absorbing member should advance the stable buckling deformation when the axial compressive load is applied. That is, as shown in FIG. 7, in order for the shock absorbing member to advance the buckling deformation during application of the axial compressive load, the shock absorbing member should ideally have a rectangular wave shaped characteristic in which the corresponding axial compressive load is a generally constant value with respect to the stroke or the amount of deformation.

One type of material having such a superior rectangular wave shaped characteristic is aluminum alloy material formed by extrusion. Examples of shock absorbing members adopting this aluminum alloy material are disclosed in Japanese Patent Laid-Open Publication No. 6(1994)-247338, Japanese Patent Laid-Open Publication No. 8(1996)-268323, Japanese Patent Laid-Open Publication No. 8(1996)-310440, Japanese Patent Laid-Open Publication No. 11(1999)-29064, Japanese Patent Laid-Open Publication No. 11(1999)-208519, and Japanese Utility Model Laid-Open Publication No. 7(1995)-35252.

From the point of view of the adoption to a vehicle, however, these shock absorbing members having a rectangular wave shaped characteristic do not always show good characteristics and performance. That is, when this shock absorbing member is adopted to a vehicle, as shown in FIG. 7, the proof stress FB of a vehicular body is set so as to be somewhat larger than the above mentioned roughly constant value of the axial compressive load. Then, when the buckling deformation of the shock absorbing member is advanced within the range of the proof stress FB of the body, the impact energy at the collision is absorbed. In recent years, however, the safety performance during high speed collision is has been of concern and the safety performance in the ODB (offset deformable barrier) collision which simulates an offset collision between vehicles is estimated. In this estimation, even if the proof stress of the body of one vehicle (own vehicle) is large and the one vehicle could decelerate and absorb the impact energy while destroying only another vehicle (the other vehicle), a good result is not obtained. Ideally, it is desirable that both vehicles be destroyed just the same (or that neither vehicle be destroyed significantly more than the other) and that both vehicles are able to decelerate while absorbing the impact energy. In other words, it is necessary to consider not only the safety performance of one vehicle but also the assailing performance to another vehicle.

The axial compressive load accompanying the collision and applied to the shock absorbing member is transmitted to the body and also to another vehicle as a reaction force. Accordingly, the axial compressive load against the shock absorbing member becomes a criteria for the assailing performance to another vehicle. That is, it is necessary that the axial compressive load to the shock absorbing member which is transmitted to another vehicle as the reaction force is set smaller than the proof stress of the body of the other vehicle.

In situations where the above mentioned shock absorbing member is adopted, however, the axial compressive load to the shock absorbing member which is transmitted to another vehicle as the reaction force is a roughly constant value. Accordingly, it is necessary that the axial compressive load characteristic of the shock absorbing member be set while fixing the proof stress of the body of another vehicle as a standard regardless of the proof stress of the body of the one vehicle. As a result, the absorption of the impact energy becomes insufficient. Further, if the length of the shock absorbing member increases for absorbing sufficient impact energy by increasing the stroke (i.e., the amount of deformation), it is necessary to provide a large space for disposing the shock absorbing member.

Accordingly, a need exists for an improved shock absorbing member and a bumper which is not as susceptible to the drawbacks identified above.

SUMMARY OF THE INVENTION

According to one aspect of the present invention, a shock absorbing member for a vehicle which absorbs the impact energy in a plastic deformation manner so that the axial compressive load is absorbed has a hollow structure whose cross-section is constant and whose axis is adapted to extend forward and rearward of the vehicle. The shock absorbing member is constructed so that the axial compressive load is gradually increased according to advance of the plastic deformation.

When the plastic deformation advances, the corresponding axial compressive load is increased gradually. Accordingly, the axial compressive load applied upon the occurrence of a collision increases gradually to accompany the advance of the plastic deformation. For example, when one vehicle collides against another vehicle, the axial compressive load which increases gradually according to the advance of the plastic deformation is transmitted to another vehicle as a reaction force. Because the axial compressive load in the initial stage of the plastic deformation is low, the assailing performance to the other vehicle is decreased. Further, because the axial compressive load increases gradually within the range of the proof stress FB of one vehicle according to the advance of the plastic deformation, sufficient impact energy is absorbed.

According to another aspect of the invention, a shock absorbing member for a vehicle which absorbs the impact energy in a plastic deformation manner with the axial compressive load being absorbed includes a hollow member whose cross-section is constant and whose axis is adapted to extend forward and rearward of the vehicle and a flange which is formed on the hollow member roughly along the axis of the hollow member. The projecting amount of the flange increases gradually from one side toward the other side of the hollow member.

In accordance with another aspect of the present invention, a vehicle bumper includes a bumper reinforcing member, a body, and a pair of hollow crash boxes each of which extends forward and rearward of the vehicle and each of which has a roughly constant cross section. Each crash box has one end fixed to the bumper reinforcing member and the other end fixed to the body. Each crash box also has a flange whose projecting amount increases gradually from one side toward the other side of along the axis of the crash box.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 2:
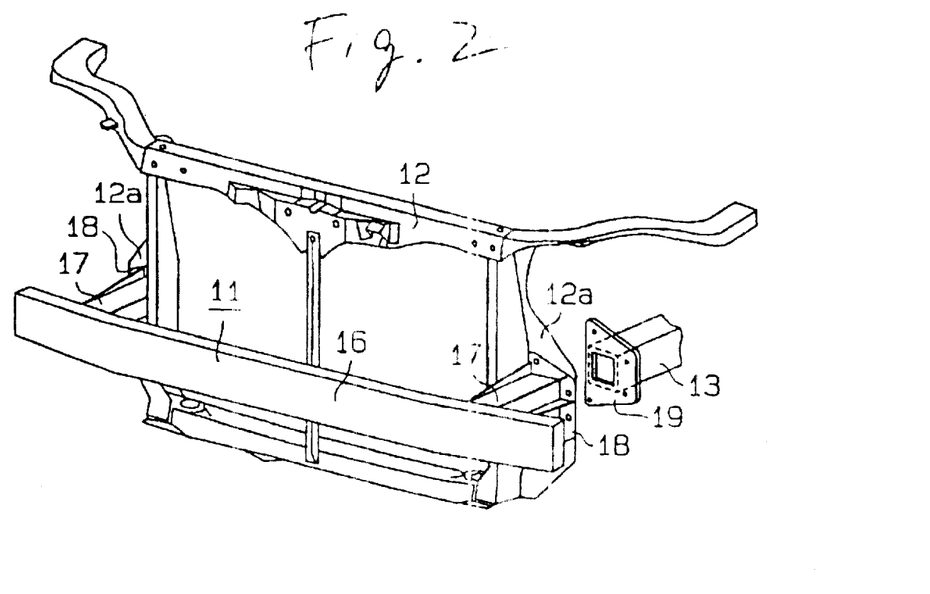
FIG. 2 is a perspective view of a front portion of a vehicle to which is applied the crash box of the present invention as shown in FIG. 1.

Referring initially to FIG. 2 which illustrates the front portion of a vehicle, a bumper frame 11, a radiator support 12 and a side member 13 constituting a part of the vehicle body are disposed in the front portion of the automobile. The bumper frame 11 is provided with a bumper reinforcing member 16 extending in the lateral direction of the vehicle and a pair of crash boxes 17 functioning as a shock absorbing member. Each of the crash boxes 17 is connected to one end portion of the bumper reinforcing member 16 and has a hollow structure possessing axis extending rearward of the vehicle. A bracket 18 for securing bolts is provided at the rear end portion of each of the crash boxes 17.

The radiator support 12 is a roughly square-shaped frame and is fixed to the body. A bracket 12a is provided at both side portions of the radiator support 12. The brackets 12a extend in the lateral direction corresponding to the bracket 18 of the crash box 17. The bracket 18 of each of the crash boxes 17 is positioned opposite to the respective bracket 12a of the radiator support 12.

The side member 13 has a roughly square tubular shape possessing an axis extending so as to coincide roughly with the axis of the crash box 17. A bracket 19 for securing bolts is provided at the front end of the side member 13. Each bracket 19 corresponds in position to the respective bracket 18 of the crash box 17. Accordingly, the bracket 18 of each of the crash boxes 17 is secured to the bracket 19 for the respective side member 13 through the radiator support 12 (i.e., the bracket 12a of the radiator support 12). The bumper frame 11 is thus fixed to the body.

When an impact is applied from the front side through a collision of the vehicle or the like, this impact is transmitted to the body (the side member 13) through the crash boxes 17 of the bumper frame 11. In this case, the crash boxes 17 repeat the buckling deformation and absorb the impact transmitted to the body. The impact energy applied to the body and possibly transmitted to the passengers is thus absorbed.

Figure 1:
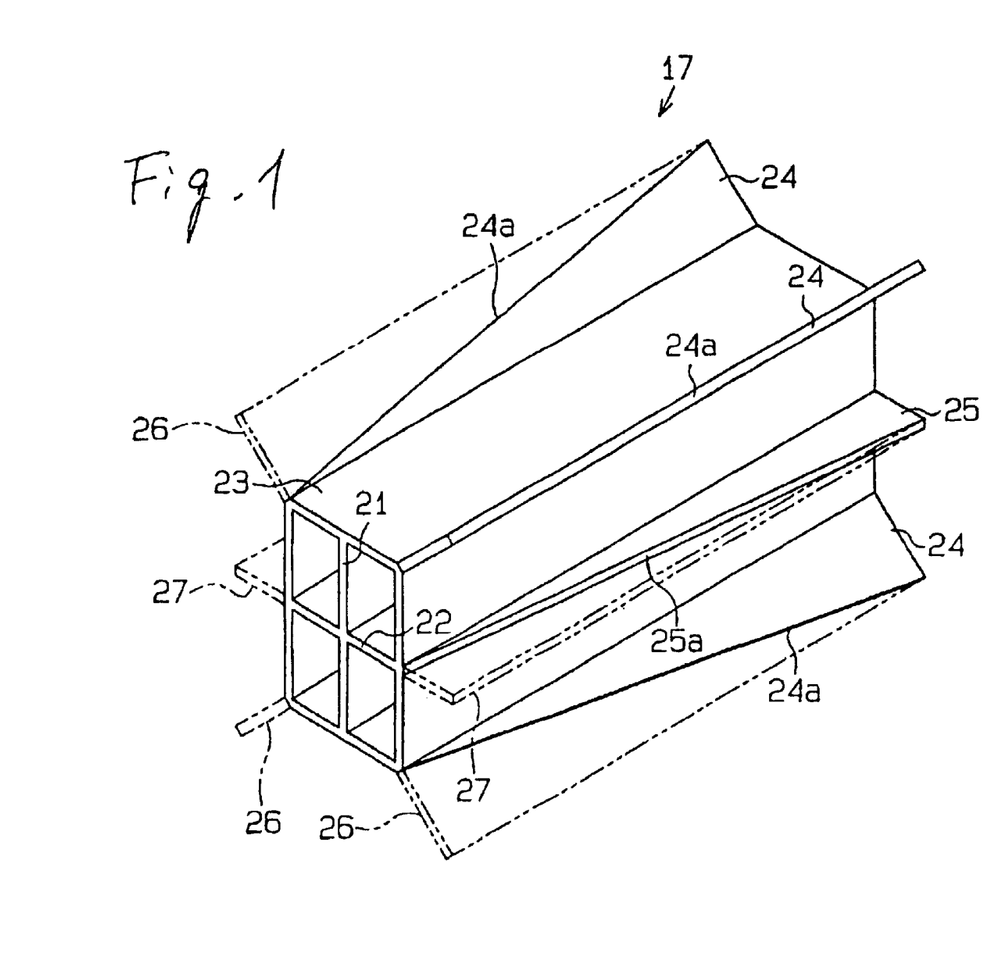
FIG. 1 is a perspective view of a crash box according to one embodiment of the present invention.

The structure of the crash box 17 is illustrated in FIG. 1 which schematically illustrates the crash box from the bumper reinforcing member side. As shown in FIG. 1, the crash box 17 has a roughly square tubular shape and is provided with a first partition wall 21 and a second partition wall 22. These partition walls 21, 22 intersect each other at right angles and extend along the axis of the crash box 17. Accordingly, the crash box 17 is a hollow member 23 having a constant cross-section along its length. The two partition walls generally define a four-square shape having four squares.

A first flange 24 is provided on each of the corner portions of the crash box 17. The first flanges 24 project outwardly in the radial direction. Each of the first flanges 24 is configured in the manner illustrated in FIG. 1 so that beginning at the top end side or front end side of the first flanges 24 (i.e., the side or end closest to the bumper reinforcing member 16 in FIG. 2) a taper portion 24a is formed. By virtue of this taper portion 24a, the projecting amount of the first flange 24 increases gradually toward the base end side or rear end side of the first flanges 24 (i.e. the side or end closest to the side member 13 in FIG. 2).

Further, on a line which divides in two each of the side walls of the crash box 17 along the axis, a second flange 25 is provided. The second flanges project outward in the radial direction. The second flanges 25 are configured in the manner illustrated in FIG. 1 so that beginning at the top end side or front end side of the second flanges 25 (i.e., the side or end closest to the bumper reinforcing member 16 in FIG. 2) a taper portion 25a is formed. By virtue of this taper portion 25a, the projecting amount of the second flange 25 increases gradually toward the base end side or rear end side of the second flanges 25 (i.e. the side or end closest to the side member 13 in FIG. 2).

The first and second flange portions 24, 25 provided on the crash box 17 are formed in the following manner. First, a hollow member is formed having a constant cross section defining the roughly four square shaped configuration and projecting portions projecting radially outwardly from each corner portion and from roughly the center portion of each side surface. This hollow member with the projections is manufactured as a raw material by extrusion of aluminum alloy material. Accordingly, this raw material of the crash box 17 is provided with flanges 26, 27, each of which projects outwardly in the radial direction by a predetermined amount. Then, these flanges 26, 27 are cut obliquely from the one end side toward the base or opposite end side. As a result, the first flanges 24 having the taper portions 24a and the second flanges 25 having the taper portions 25a are formed, thus producing the crash box 17.

Figure 3:
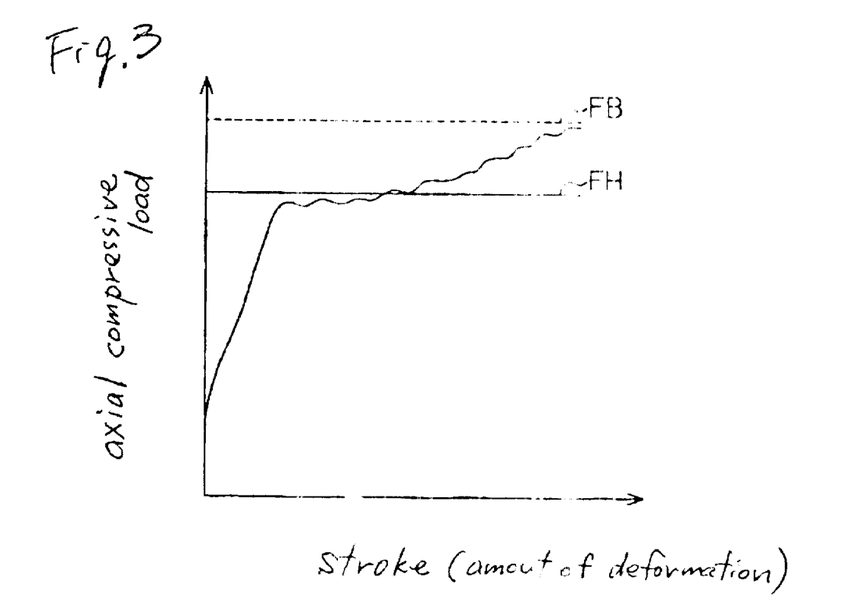
FIG. 3 is a graph showing the relationship between the axial compressive load and the stroke associated with the present invention.

The characteristics of the amount of deformation (the stroke) with respect to the axial compressive load of the crash box 17 is described below. FIG. 3 is a graph showing the relationship between the axial compressive load and the amount of deformation (the stroke) obtained by experiment. By virtue of the first and second flanges 24, 25, each of which projects by a gradually increasing amount toward the base end side (i.e., the side adjacent the side member 13 in FIG. 2), the stiffness of the crash box 17 against the axial compressive load is increased gradually from the top end side toward the base end side roughly along the axis of the crash box. Thus, as shown in FIG. 3, the axial compressive load is increased gradually to accompany the advance of the plastic deformation. The axial compressive load having this characteristic is transmitted to the body (the side member 13) and, for example, upon a collision between vehicles, the axial compressive load becomes the criteria of the load transmitted to the other vehicle.

In this embodiment, at the initial stage of the plastic deformation, the corresponding axial compressive load is set to increase gradually near a proof stress FH which is smaller than the proof stress FB of the body. For example, the proof stress FH is set to a suitable value so that the load transmitted to another vehicle as a reaction force does not result in remarkable damage upon the occurrence of a collision between the vehicles. Accordingly, the assailing performance to another vehicle can be decreased. Further, the axial compressive load is set to increase gradually within the range of the proof stress FB to accompany the advance of the plastic deformation. Accordingly, sufficient impact energy can be absorbed to accompany the advance of the plastic deformation.

In addition, because sufficient impact energy can be absorbed while preventing the crash box 17 from increasing the amount of the deformation, it is not necessary to increase the length of the crash box 17. It is thus also not necessary to provide a large space for accommodating the crash box 17.

As described above, the projecting amount of each of the first and second flanges 24, 25 increases gradually from the side of the bumper reinforcing member 16 of the crash box 17 toward the side of the body (the side member 13). Accordingly, the plastic deformation due to the axial compressive load is started from the side of the bumper reinforcing member 16 of the crash box 17 whose stiffness against the axial compressive load is low. Then, the plastic deformation due to the axial compressive load advances from the side of the bumper reinforcing member 16 toward the side of the body having high stiffness while shortening the moment arm. Because the body side is in the last stage of the impact absorption accompanying the advance of the plastic deformation, a large load is not transmitted to the side of the body at the initial stage of, for example, the collision. Therefore, it is possible to inhibit or prevent the body side of the crash box 17 from bending at the initial stage of the collision and so a good impact absorption function can be maintained.

As mentioned above, the hollow member having the roughly constant cross section and provided with the flanges 26, 27 is manufactured by extrusion of aluminum alloy material. Then, the flanges 26, 27 are cut during a cutting process to thus form the crash box 17 having the first and second flanges 24, 25 with the taper portions 24a, 25a. Accordingly, it is possible to simplify the manufacturing process of the crash box 17.

Figure 4:
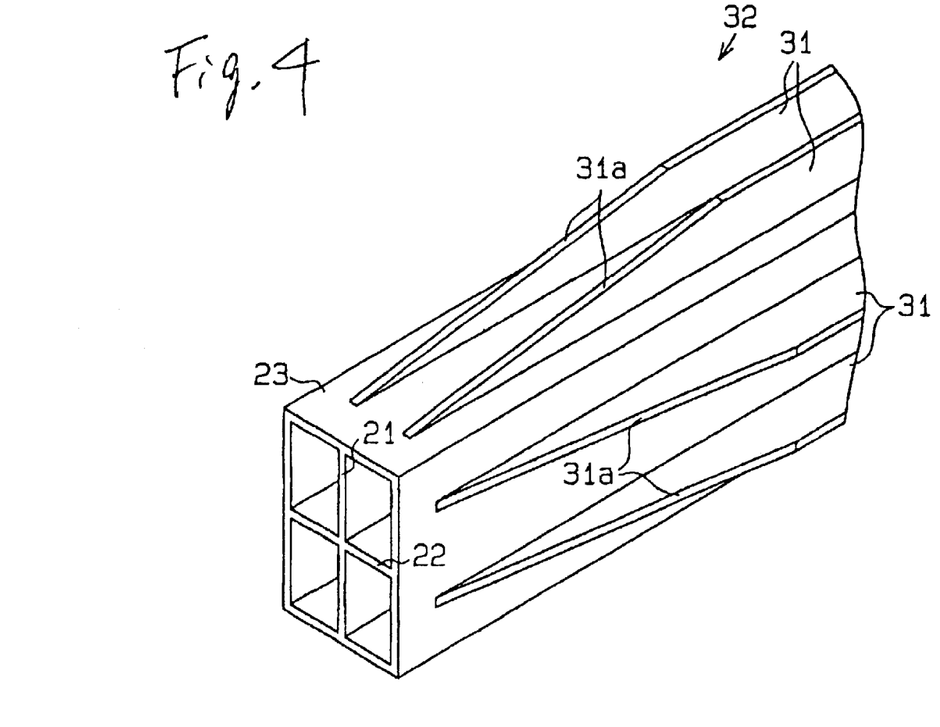
FIG. 4 is a perspective view of a modified version of the crash box.
Figure 5:
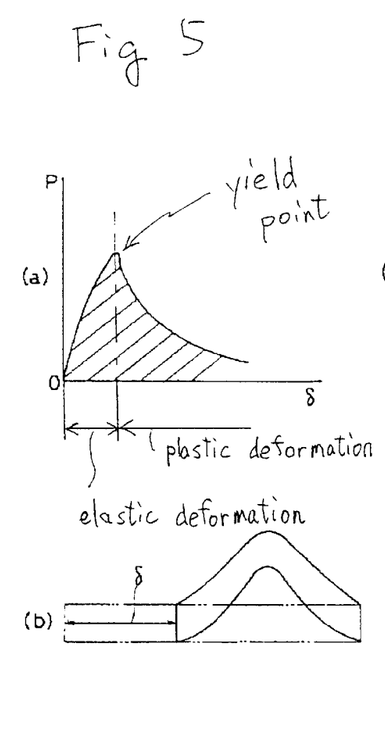
FIG. 5 is a perspective view of another modified version of the crash box.
Figure 6:
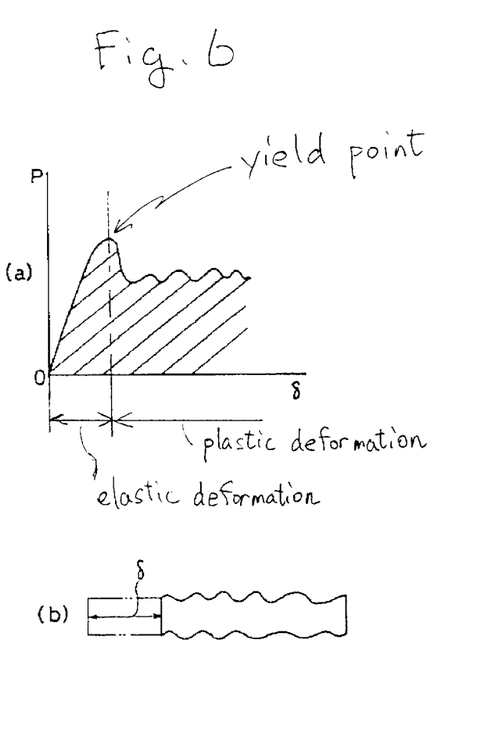
FIG. 6 is a perspective view of a further modified version of the crash box.

FIGS. 4–6 illustrate modified version of the embodiment of the present invention shown in FIGS. 1–3. In the modification shown in FIG. 4, a crash box 32 is formed in such a manner that plural flanges 31 project vertically from each side surface of the hollow member 23. The flanges 31 are configured with taper portions 31a which are the same as in the above-described embodiment. It is thus possible to obtain effects that are the same as those discussed above. In FIG. 4, a flange is not formed on the top end of the hollow member 23. However, it is possible to form the same flanges 31 on the top end of the hollow member 23 forming the crash box.

Further, as shown in FIG. 5, it is possible to configure the crash box to possess bypass walls 34, 35 which connect between the adjacent side walls. In this version, the bypass walls 34, 35 are cut obliquely outward from the top end side toward the base end side. The result is a crash box 38 having the bypass walls 34, 35 forming the flange portions 36, 37 whose projecting amount increases gradually toward the base end side. This modified version of the present invention achieves advantageous effects similar to those discussed above. In the illustrated embodiment of FIG. 5, a flange is not formed at the top end of the hollow member 33. However, it is possible to form the same flanges 36, 37 on the top end of the hollow member 33.

FIG. 6 shows a further modified version of the present invention. In this modified version, the crash box 48 includes a hollow member 41 having a roughly circular constant cross-section, rectangular walls 42 disposed around the hollow member 41 and central walls 43, 44, 45, 46 extending from the roughly center portion of each of the rectangular walls 42 at right angles toward the hollow member 41 and connected radially to the hollow member 41. In this case, during manufacture, the center walls 43, 44, 45, 46 with the rectangular walls 42 are cut obliquely outward from the top end side toward the base end side. The result is the crash box 48 having the center walls 43, 44, 45, 46 forming the flange portions 47 which project an amount gradually increasing toward the base end side. In this modified version of the present invention, it is possible to obtain the same advantageous effects as those discussed above. In FIG. 6, a flange is not formed on the top end of the hollow member 41. However, it is possible to form the same flange portion 47 at the top end of the hollow member 41.

As described above, the cross-sectional shape of the hollow member possesses a four-square configuration. The cross-sectional shape of the hollow member may be a different constant shape such as, for example, a generally three-square shape, a generally two-square shape, and a generally rectangular shape. Forming flanges on these hollow members produces a crash box having advantageous effects similar to those discussed above.

In the above-described embodiment and the modifications, the flanges are formed to project outward. However, it is also possible to form the flanges to project inwardly. If the flanges project inwardly, the projecting ends of the flanges may be formed on the other flange or the inner wall surface as one body. If the hollow member includes the partition walls, the flange can be formed by cutting one side of the partition walls. In such modifications, it is once again possible to achieve results similar to those discussed above.

Further, the number of flanges is not limited to the numbers shown in the various drawing figures. Further, with respect to the manufacture of the crash box, the flanges need not be always formed by extrusion of the aluminum alloy material. It is possible to form only the hollow member by extrusion of the aluminum alloy material, with the flanges (e.g., the first and second flanges 24, 25) being joined or connected to the hollow member.

In the above-described embodiment and modifications, the crash box is made of aluminum alloy material. However, it is possible to use other material for making the crash box. Further, it is also possible to form the crash box utilizing other manufacturing method such as, for example bending, joining and others.

As described above, the bumper frame 11 and the side member 13 are connected through the radiator support 12. However, it is also possible to directly connect the bumper frame 11 and the side member 13. The present invention can also be utilized as a bumper for the rear portion of the automobile and can be used not only for bumpers for automobiles, but also as the side member (front or rear) for the vehicle, for example.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A shock absorbing member for a vehicle which absorbs impact energy in a plastic deformation manner to absorb an axial compressive load, comprising a hollow structure having a constant cross section and an axis adapted to extend forward and rearward of the vehicle, the hollow structure having an interior divided into a plurality of separate square-shaped hollow portions, the hollow structure of the shock absorbing member being provided with a flange having a tapered portion so that the axial compressive load is increased gradually in response to advance of the plastic deformation.

2. The shock absorbing member according to claim 1, wherein the hollow structure has an outer periphery, and a plurality of flanges extending outwardly from the outer periphery of the hollow structure.

3. The shock absorbing member according to claim 1, wherein the hollow structure has a round cross-section, and a plurality of flanges extending outwardly from an outer periphery of the round cross-section.

4. The shock absorbing member according to claim 1, wherein the hollow structure has a rectangular cross-section possessing four sides, and a plurality of flanges extending outwardly from an outer periphery of several of the sides.

5. The shock absorbing member according to claim 4, wherein the flanges are aligned with sides of the rectangular cross-section.

6. A shock absorbing member for a vehicle which absorbs impact energy though plastic deformation to absorb the axial compressive load, comprising a hollow member having a constant cross section and an axis adapted to extend forward and rearward of the vehicle, the hollow member having one end side and an other end side, the hollow member being provided with a flange provided on the hollow member along the axis of the hollow member, the flange projecting from the hollow member by an amount that increases gradually from adjacent the one end side of the hollow member toward the other end side of the hollow member.

7. The shock absorbing member according to claim 6, wherein the projecting amount of the flange increases gradually toward a base end side of the hollow member.

8. The shock absorbing member according to claim 6, wherein the hollow member has an interior divided into a plurality of separate square-shaped hollow portions.

9. The shock absorbing member according to claim 6, wherein the hollow member has an outer periphery, and a plurality of flanges extending outwardly from the outer periphery of the hollow member.

10. The shock absorbing member according to claim 6, wherein the hollow member has a round cross-section possessing an outer periphery, and a plurality of flanges extending outwardly from the outer periphery of the round cross-section.

11. The shock absorbing member according to claim 6, wherein the hollow member has a rectangular cross-section possessing four sides, each of the four sides possessing an outer periphery, and including a plurality of flanges extending outwardly from the outer periphery of each of at least several of the four sides.

12. The shock absorbing member according to claim 6, wherein the hollow member has a plurality of sides and a plurality of corners, with a flange projecting outwardly from several of the sides and from several of the corners, at least some of the flanges projecting outwardly by an amount that gradually increases along the hollow member.

13. A bumper for a vehicle comprising:

a bumper reinforcing member;

a body;

a pair of hollow crash boxes each of which is adapted to extend forward and rearward of the vehicle and each of which has a constant cross section, each of the crash boxes having one end fixed to the bumper reinforcing member and an opposite end fixed to the body, the hollow crash boxes each having one end side and an opposite end side, each of the hollow crash boxes being provided with a flange projecting by an amount that gradually increases from the one end side of the hollow crash box toward the opposite end side of the hollow crash box.

14. The bumper according to claim 13, wherein the amount of projection of the flange gradually increases from the end side of the hollow crash box located adjacent the bumper reinforcing member toward the end side located adjacent the body.

15. The bumper according to claim 13, wherein each of said hollow crash boxes has a plurality of outwardly extending flanges.

16. The bumper according to claim 13, wherein each of said hollow crash boxes includes a hollow member possessing a round cross-section and a plurality of flanges extending outwardly from the round cross-section.

17. The bumper according to claim 13, wherein each of said crash boxes possesses a rectangular cross-section possessing four sides and a plurality of flanges extending outwardly from at least several of the sides.

18. The bumper according to claim 13, wherein each of said crash boxes includes a hollow member having a plurality of sides and a plurality of corners, and including a flange projecting outwardly from several of the sides and from several of the corners, at least some of the flanges projecting outwardly by an amount that gradually increases along the hollow member.

* * * * *

UNITED STATES PATENT AND TRADEMARK OFFICE
CERTIFICATE OF CORRECTION

PATENT NO.     : 6,705,653 B2
DATED          : March 16, 2004
INVENTOR(S)    : Terutsugu Gotanda et al.

It is certified that error appears in the above-identified patent and that said Letters Patent is hereby corrected as shown below:

<u>Title page,</u>
Insert Item -- [73], Assignee:
Aisin Seiki Kabushiki Kaisha, Kariya-shi, Aichi-ken, Japan;
Aisin Keikinzoku Kabushiki Kaisha, Shinminato-shi, Toyama-ken, Japan --.

Delete Drawing Sheet 4 of 5 (Figures 5 and 6) and replace it with attached Sheets 4 of 5 (Figures 5 and 6).

Signed and Sealed this

Eleventh Day of October, 2005

JON W. DUDAS
*Director of the United States Patent and Trademark Office*

Fig. 6

Fig. 5